(12) United States Patent
Parla

(10) Patent No.: US 12,200,068 B2
(45) Date of Patent: *Jan. 14, 2025

(54) SECURE ACCESS APP CONNECTORS

(71) Applicant: Cisco Technology, Inc., San Jose, CA (US)

(72) Inventor: Vincent E. Parla, North Hampton, NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,724

(22) Filed: Sep. 27, 2023

(65) Prior Publication Data

US 2024/0291893 A1 Aug. 29, 2024

Related U.S. Application Data

(63) Continuation of application No. 18/113,256, filed on Feb. 23, 2023, now Pat. No. 11,863,631.

(51) Int. Cl.
*G06F 15/16* (2006.01)
*H04L 9/40* (2022.01)
(Continued)

(52) U.S. Cl.
CPC ........ *H04L 67/141* (2013.01); *H04L 63/0272* (2013.01); *H04L 67/146* (2013.01)

(58) Field of Classification Search
CPC .. H04L 63/0272; H04L 67/141; H04L 67/146
(Continued)

(56) References Cited

U.S. PATENT DOCUMENTS 6,988,126 B2 * 1/2006 Wilcock ............... H04L 67/53
709/204
7,000,019 B2 * 2/2006 Low ..................... G06Q 20/40
455/2.01

(Continued)

FOREIGN PATENT DOCUMENTS

CN 108989488 12/2018
CN 112866074 B 4/2022
(Continued)

OTHER PUBLICATIONS

Marshall, Alex, "Architecting Network Connectivity for a Zero Trust Future" Twingate, Jan. 12, 2022, 20 pages.
(Continued)

*Primary Examiner* — Moustafa M Meky
(74) *Attorney, Agent, or Firm* — Lee & Hayes, P.C.

(57) ABSTRACT

Techniques for creating in/out App Connectors for secure access solutions without the need for STUN, TURN, and/or a long-lived control plane component. The techniques may include, among other things, establishing, by an App Connector associated with a workload hosted by an enterprise network, a pool of idle sessions between the App Connector and a termination node associated with the enterprise network. The techniques may also include determining, by the App Connector, that a first idle session of the pool of idle sessions has been consumed by the termination node to establish a communication session for a client device to communicate with the workload. Based at least in part on determining that the first idle session has been consumed, the techniques may include establishing, by the App Connector, a second idle session to be added to the pool of idle sessions between the App Connector and the termination node.

20 Claims, 5 Drawing Sheets

(51) Int. Cl.
  *H04L 67/141* (2022.01)
  *H04L 67/146* (2022.01)
(58) Field of Classification Search
  USPC .......................................................... 709/227
  See application file for complete search history.

(56) References Cited

U.S. PATENT DOCUMENTS

| | | | |
|---|---|---|---|
| 7,334,017 B2 * | 2/2008 | Hawkes ................ | H04M 3/493 709/204 |
| 7,684,392 B2 | 3/2010 | Saito et al. | |
| 7,746,873 B2 | 6/2010 | Saito et al. | |
| 8,074,259 B1 | 12/2011 | Levy et al. | |
| 8,112,532 B2 | 2/2012 | Ahluwalia et al. | |
| 8,400,971 B1 * | 3/2013 | Narendran .......... | H04L 65/4061 370/335 |
| 8,539,565 B2 * | 9/2013 | Beletski .................. | G06F 9/505 726/5 |
| 8,543,718 B2 | 9/2013 | Rahman et al. | |
| 8,626,234 B2 | 1/2014 | Miller | |
| 9,154,556 B1 * | 10/2015 | Dotan ................... | H04L 43/045 |
| 9,300,563 B2 | 3/2016 | Rahman et al. | |
| 10,505,997 B2 | 12/2019 | Linden et al. | |
| 10,992,744 B1 * | 4/2021 | Kutuzov ............. | H04L 67/1012 |
| 11,076,001 B1 | 7/2021 | Mohamed | |
| 11,082,217 B1 | 8/2021 | Donlan et al. | |
| 11,349,930 B2 | 5/2022 | Vaykole et al. | |
| 11,405,471 B2 * | 8/2022 | Mohamed ............. | H04L 67/146 |
| 11,665,229 B1 * | 5/2023 | Kutuzov ............. | H04L 67/1012 709/226 |
| 11,716,395 B2 * | 8/2023 | Cunningham ........ | H04L 63/061 709/227 |
| 11,863,631 B1 * | 1/2024 | Parla .................... | H04L 67/146 |
| 11,949,737 B1 * | 4/2024 | Kutuzov ................. | H04L 67/61 |
| 2002/0091832 A1 * | 7/2002 | Low ....................... | G06Q 30/02 709/227 |
| 2002/0172207 A1 | 11/2002 | Saito et al. | |
| 2006/0209760 A1 | 9/2006 | Saito et al. | |
| 2007/0207591 A1 | 9/2007 | Rahman et al. | |
| 2009/0241176 A1 * | 9/2009 | Beletski .................. | G06F 9/505 709/241 |
| 2010/0098085 A1 | 4/2010 | Wu et al. | |
| 2010/0325285 A1 | 12/2010 | Ahluwalia et al. | |
| 2011/0151924 A1 | 6/2011 | Miller | |
| 2015/0278739 A1 * | 10/2015 | Parker .............. | G06Q 10/06315 705/7.25 |
| 2016/0057211 A1 | 2/2016 | Thapliyal et al. | |
| 2016/0323179 A1 | 11/2016 | Wang et al. | |
| 2021/0152624 A1 * | 5/2021 | Vaykole ................ | H04L 67/141 |
| 2021/0185015 A1 | 6/2021 | Sapp et al. | |
| 2021/0377347 A1 * | 12/2021 | Mohamed ............. | H04L 67/146 |
| 2022/0247823 A1 * | 8/2022 | Cunningham ...... | H04L 63/0435 |
| 2022/0286911 A1 | 9/2022 | Howe et al. | |
| 2022/0329576 A1 | 10/2022 | Nikam et al. | |
| 2023/0319148 A1 * | 10/2023 | Cunningham ...... | H04L 63/0807 709/227 |
| 2024/0089797 A1 * | 3/2024 | Huang .................. | H04W 28/16 |

FOREIGN PATENT DOCUMENTS

| | | |
|---|---|---|
| CN | 114615328 | 6/2022 |
| EP | 1989835 B1 | 1/2014 |

OTHER PUBLICATIONS

Anonymous: "Reference Design: VMware NSX for vSphere (NSX) Network Virtualization Design Guide", VMware, Nov. 18, 2017, Retrieved from https://web.archive.org/web/20171118210746if_/httpg://www.vmware.com/content/dam/digitalmarketing/vmware/en/pdf/products/nsx/vmw-nsx-network-virtualization-design-guide.pdf on Jul. 24, 2023, Sections: 3.1.5 NSX Edge Services Gateway, 3.1.7 Distributed Firewall, XP093066527, pp. 1-167.

PCT Search Report and Written Opinion for PCT Application No. PCT/US24/17142, Dated Jun. 3, 2024, 13 pages.

* cited by examiner

SECURE ACCESS APP CONNECTORS

CROSS-REFERENCE TO RELATED APPLICATION

This patent application is a continuation of and claims priority to U.S. patent application Ser. No. 18/113,256, filed Feb. 23, 2023, which is fully incorporated herein by reference.

TECHNICAL FIELD

The present disclosure relates generally to techniques for, among other things, creating in/out App Connectors for Zero Trust and other secure access solutions without the need for STUN (Session Traversal Utilities for NAT), TURN (Transversal Using Relays around NAT), and/or a long-lived control plane component.

BACKGROUND

Secure access solutions, such as Zero Trust, build in/out App Connectors using either a STUN model, a TURN model, a combination of both, or a similar approach that relies on a long-lived control plane connection as part of the Zero Trust solution. This means that some type of control plane connection must be maintained for a long period of time and then, when resource access is requested, the STUN, TURN or similar exchange is performed to wire up the endpoint session with an App Connector running near the workload.

Such an approach has the drawback of the long-lived control plane connection being required, at a minimum, from the proxy or other service within the ecosystem. While the client side of the solution can be more ephemeral with building a control plane connection at the time of a resource access request, they are often created as a long-lived connection, thereby reducing battery life. Additionally, in this model, the control plane and the data plane are separate connections/sessions. This means that for a resource request at least one control plane session must be created and then one or more data plane sessions are bootstrapped from the control plane session. This has the downside of having to build multiple connections/sessions in order to have in/out App Connectors that can create reverse session establishment through NAT and firewall devices. Moreover, when a STUN session cannot be built and a cloud TURN server must be used to splice the two sessions together, the TURN server is costly to operate and adds another level of complexity to the solution.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
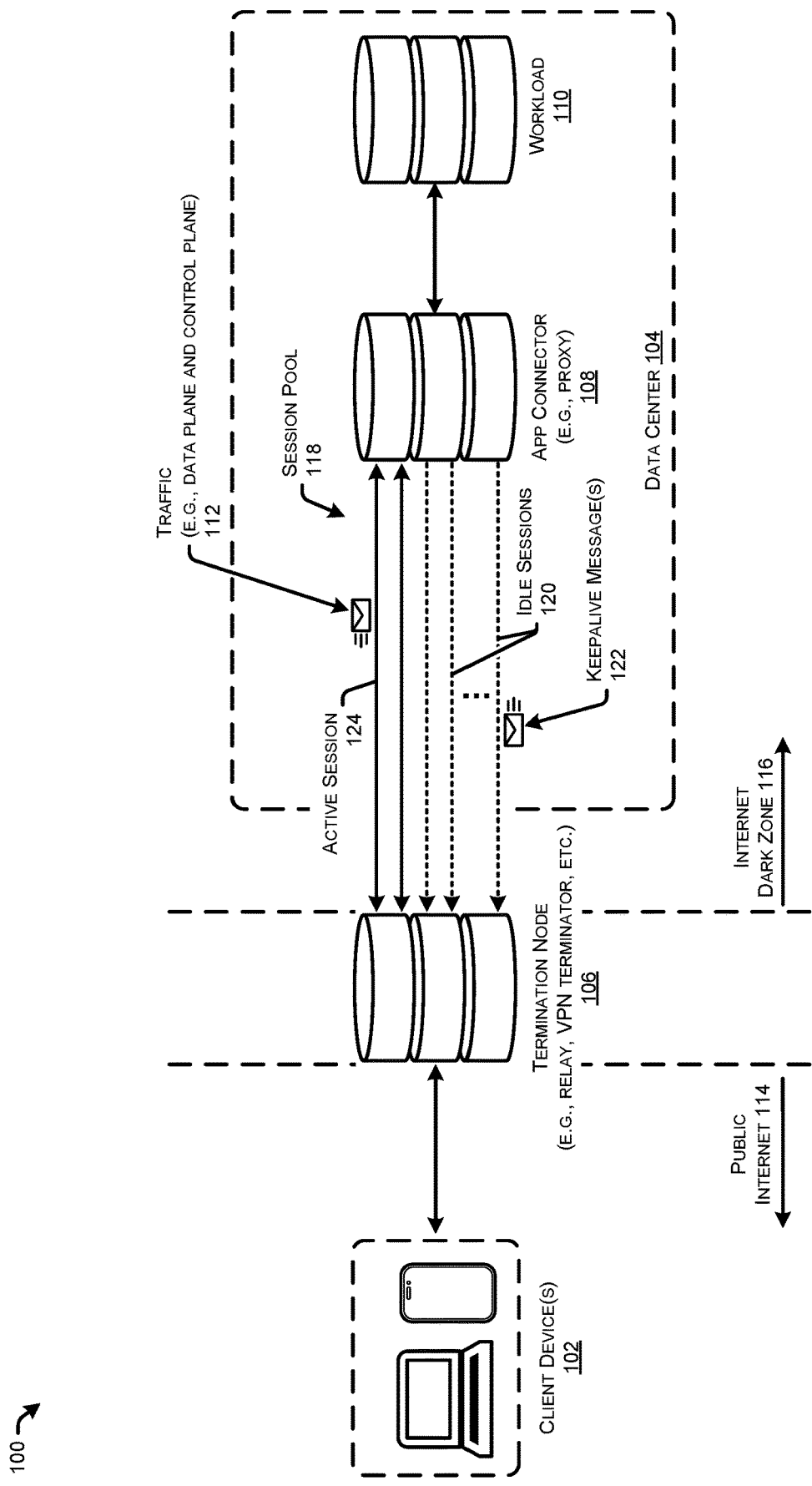
FIG. 1 illustrates an example architecture that may implement various aspects of the technologies described herein.

This disclosure describes various technologies for creating in/out App Connectors for Zero Trust and other secure access solutions without the need for STUN, TURN, and/or a long-lived control plane component. By way of example, and not limitation, the techniques disclosed herein may include establishing a pool of idle sessions between an App Connector and a client device, the App Connector associated with a workload that is hosted by an enterprise network. The method may also include determining that a first idle session of the pool of idle sessions has been consumed to establish a communication session for the client device to communicate with the workload. Based at least in part on determining that the first idle session has been consumed, the method may include establishing a second idle session to be added to the pool of idle sessions.

The techniques described herein may be performed as a method and/or by a system having non-transitory computer-readable media storing computer-executable instructions that, when executed by one or more processors, cause the system to perform the techniques described above and herein.

EXAMPLE EMBODIMENTS

As noted above, Zero Trust solutions build in/out App Connectors using a STUN or TURN model, or a combination of both, and also rely on long-lived control plane connections as part of the Zero Trust solution. This means that some type of control plane connection must be maintained for a long period of time and then, when resource access is requested, the STUN or TURN exchange is performed to wire up the endpoint session with an App Connector running near the workload. However, building in/out App Connectors in this fashion has several drawbacks. For instance, some of these drawbacks include, but are not limited to: (i) a reduction in battery life due to maintaining the long-lived control plane connection; (ii) having to build multiple connections/sessions in order to have in/out App Connectors that can create reverse session establishment through NAT and firewall devices; and (iii) using a costly and/or complex cloud TURN server to splice two sessions together when a STUN session cannot be built.

As described previously, the most common implementation of in/out App Connectors are created using a STUN and/or TURN model where a proxy must maintain a long-lived control plane session with a cloud service in order to make endpoint to resource access connections. This also means that a customer cannot easily operate their own solution exclusive on premise like is found in a typical VPN (virtual private network) offering because of the network complexities of running a STUN and TURN service on a per enterprise basis in their own networks. This is because the STUN and TURN service has to be internet reachable and most enterprises will have a firewall in between, making this type of deployment unlikely in practice. This is why commercially available STUN and TURN services are operated by the product vendor and not in a way where the enterprise can run it themselves on the edge.

This application is directed to techniques for creating in/out App Connectors for secure access solutions (e.g., Zero Trust) without the need for a STUN server, TURN server, and/or a long-lived control plane component. In some examples, the techniques may utilize a relay model and still allow App Connectors to build in/out connections in the same manner. For instance, an enterprise secure termination node (e.g., relay node, VPN termination node, etc.) may be used in place of a STUN or TURN service and in a way that a long-lived control plane connection is not needed between the termination node and the in/out App Connector. Instead, a data plane may be all that is needed, thus eliminating the need for both control plane and data plane components.

In some examples, the App Connector (e.g., a proxy, or also referred to herein as an "in/out App Connector") may be provisioned with a cryptographic token (e.g., client certificate, JWT (JSON Web Token), or some equivalent, non-interactive, cryptographically secure mechanism) to authenticate with the enterprise termination node. In some examples, the App Connector may create a connection pool of sessions with the enterprise termination node using the cryptographic token to authenticate itself. For instance, when a client certificate is used, an underlying TLS (Transport Layer Security) session via QUIC (Quick UDP Internet Connections) is used to exchange the credential. Additionally, or alternatively, when a bearer token is used, it is exchanged as part of the CONNECT, CONNECT-UDP or CONECT-IP header at the MASQUE (Multiplexed Application Substrate over QUIC Encryption) layer of the HTTP/3 protocol.

In some examples, the termination node may be located at and/or near the edge of the network (e.g., either on-prem or cloud), while the App Connector may be located deep inside the network (e.g., enterprise network) near the workload (e.g., target, service, resource, etc.). Because the termination node may have a publicly known domain name and IP (internet protocol) address to service Zero Trust sessions over the internet, it may also be reachable by the App Connector using this same path. Additionally, or alternatively, if the private side of the termination node is known to the App Connector, the idle connection(s) can be built to that private-side as well. What is important here is that the App Connector can utilize one or more different techniques to traverse NAT components and firewall components and reach the edge termination node. By establishing a session pool using an in/out model of session establishment, the need to punch holes from the termination node to the App Connector (e.g., proxy) are eliminated and the solution can traverse NAT components because the termination node is known to the App Connector via either the termination node's public and/or private interfaces.

In some examples, and as briefly noted above, the App Connector may create a pool of one or more idle UDP sessions with the termination node and then use keepalive messages to keep the session state open through the firewalls and NAT components. In such an example, QUIC keepalives may be used to keep the session state open. However, the techniques of this disclosure are not limited to UDP sessions and QUIC keepalives, and the techniques may be employed with other protocols and keepalives as well, such as IPsec, DTLS, etc., and may provide the same or similar outcome.

In examples, the termination node may simply drop the keepalives when they arrive and this may be a very inexpensive operation using an empty PING frame if the QUIC protocol is being used.

By way of example, and not limitation, a method according to the techniques described herein may include establishing, by an App Connector associated with a workload (e.g., target, resource, service, application, etc.) hosted by an enterprise network, a pool of idle sessions between the App Connector and a termination node associated with the enterprise network. In some examples, the App Connector may be a proxy node (e.g., application segment proxy). Additionally, in some examples, the App Connector may be disposed within the enterprise network and proximate to the workload. In some examples, the termination node may be a relay node, a VPN termination node, a Secure Access Service Edge (SASE) node, an SSH termination node, and/or any other Secure Access system. Additionally, in some examples, the termination node may be disposed at or near an edge of the enterprise network (e.g., at the edge, on-prem, or in the cloud).

In some examples, the App Connector may initiate the establishment of the idle session(s) between itself and the termination node. That is, the App Connector may send connection requests toward the termination node, rather than the termination node sending the connections requests toward the App Connector. In examples, the App Connector can utilize one or more different techniques to traverse NAT and firewall components to establish the idle session(s) with the termination node. For instance, the termination node may have a publicly known domain name and IP address to service Zero Trust or other secure sessions over the internet, and the termination node may be reachable by the App Connector using this same path. Additionally, or alternatively, the private side of the termination node may be known to the App Connector, and the idle connection(s) may be built to the private-side.

In some examples, the App Connector may be provisioned with a cryptographic token (e.g., client certificate, JWT, a bearer token, or some equivalent, non-interactive, cryptographically secure mechanism) to authenticate with the termination node. In some examples, the App Connector may establish the pool of idle sessions with the termination node using the cryptographic token to authenticate itself. For instance, prior to or concurrently with establishing the idle session(s), the App Connector may send the cryptographic token to the termination node for authentication. If the termination node authenticates the App Connector, it may allow for the idle session(s) to be established. In examples, if a client certificate is used, an underlying TLS session via QUIC may be used to exchange the credential. Additionally, or alternatively, when a bearer token is used, it may be exchanged as part of a CONNECT-UDP header at the MASQUE layer of the protocol.

In some examples, each idle session of the pool of idle sessions may traverse one or more security components (e.g., firewalls), networking components (e.g., NAT), or any other intermediary networking nodes that are disposed between the termination node and the App Connector. In some examples, different idle sessions may be established with different interfaces of the termination node. For instance, a first group of one or more idle session(s) may be established with the public interface of the termination node and a second group of one or more idle session(s) may be established with the private interface of the termination node. In such an example, these different groups may have different paths between the App Connector and the termination node such that the groups do not traverse the same firewall components and/or the same NAT components.

In some examples, the App Connector or its peer may send keepalive messages to the termination node to maintain a state of each idle session in an open state through the security components and/or the networking components that the idle session may be traversing. For the case in which the idle session(s) are idle UDP sessions, QUIC keepalives may be used to keep the session state open, when that protocol is being used. However, the techniques of this disclosure are not limited to idle UDP sessions and QUIC keepalives, and the techniques may be employed with other protocols and keepalives as well, such as IPsec, DTLS, etc., and may provide the same or similar outcome. In examples, the termination node may simply drop the keepalives when they arrive and this may be a very inexpensive operation using an empty PING frame if the QUIC protocol is being used.

In some examples, a size of the pool of idle session may be fully configurable on a case-by-case basis depending on enterprise policy. For instance, the App Connector may receive a policy indicating a total number of idle sessions for the pool of idle sessions, and then the App Connector may maintain that number of idle sessions in the pool at all times or as specified. For instance, if the number of idle sessions is specified to be 10, then the App Connector will establish and maintain 10 idle sessions with the termination node at any given time.

In some examples, the techniques may also include determining, by the App Connector, that a first idle session of the pool of idle sessions has been consumed by the termination node to establish a communication session for a client device to communicate with the workload. In some examples, the App Connector may determine that the first idle session has been consumed (active) by seeing a first packet that is not a keepalive packet and, therefore, determining that is the first packet is a data packet to be serviced. Once this first data packet has been seen for the connection, the App Connector may determine that the session is no longer idle and is consumed/active. For instance, the termination node may have received a request from the client device to access the workload and, in response, the termination node utilized one of the idle sessions of the pool of idle sessions for the client device to access the workload. In some examples, the first idle session is utilized by the termination node to establish both data plane and control plane communications with the App Connector for the client device. As such, a dedicated, long-lived control plane session is not necessary to be maintained.

In some examples, the techniques may also include establishing, by the App Connector, a second idle session to be added to the pool of idle sessions between the App Connector and the termination node based at least in part on determining that the first idle session has been consumed. For instance, as noted above, a size of the idle session pool may be fully configurable. So, continuing the example from above, if one of the 10 sessions are consumed or otherwise active, then the App Connector may establish another idle session to "replace" the consumed or active session, amounting for a total of 11 sessions (e.g., 1 active session and 10 idle sessions). Furthermore, if 5 of the 10 sessions are consumed or otherwise active, then the App Connector may establish another 5 idle sessions, amounting for a total of 15 sessions (e.g., 5 active sessions and 10 idle sessions).

Additionally, in some examples, a total number of sessions, whether active or idle, may be configured by policy. For instance, a policy may specify that no more than 50 sessions may exist (idle or active) at any given time between the App Connector and the termination node. As an example, if 45 sessions were active then there would be 5 idle sessions and the App Connector would refrain from establishing any additional idle sessions because the total number of sessions would be equal to 50 (e.g., 45 active sessions and 5 idle sessions).

According to the technologies disclosed herein, several advantages in network security and computer-related technology can be realized. For instance, by causing an App Connector to establish a session pool using an in/out model of session establishment, the need to punch holes from the termination node to the App Connector are eliminated and the solution can traverse NAT and firewall components because the termination node is known to the App Connector via either the termination node's public and/or private interfaces. Further, utilizing the technologies disclosed herein may result in, but not be limited to, an increase in battery life (e.g., for client devices) due to not having to maintain any long-lived control plane connections, greater efficiencies by not having to utilize costly and complex cloud TURN servers to splice two sessions together, and easy customer operation on-prem by not having to run STUN and/or TURN services. Other advantages in computer-related technology and network security will be readily apparent to those having ordinary skill in the art.

Certain implementations and embodiments of the disclosure will now be described more fully below with reference to the accompanying figures, in which various aspects are shown. However, the various aspects may be implemented in many different forms and should not be construed as limited to the implementations set forth herein. For instance, while several of the examples below are described with respect to protocols such as HTTP/3, MASQUE, UDP, TCP, and QUIC, the aspects of this disclosure can be implemented on similar systems utilizing different protocols and communication technologies. The disclosure encompasses variations of the embodiments, as described herein. Like numbers refer to like elements throughout.

FIG. 1 illustrates an example architecture 100 that may implement various aspects of the technologies described herein. The architecture 100 includes one or more client device(s) 102, a data center 104, a termination node 106, an App Connector 108, and a workload 110.

In some examples, the client device(s) 102 may include electronic devices such as computers, laptops, cell phones, tablets, or other network-capable devices. The client device (s) 102 may be capable of sending and/or receiving traffic 112 over the public internet 114 and/or other networks to the termination node 106. In some examples, the client device(s) 102 may request to send the traffic 112 to the workload 110 that is running on resources stored within the data center 104.

In FIG. 1, the data center 104 represents the physical facility, devices, and bounds associated with an enterprise network that may reside in an internet dark zone 116. In some examples, the data center 104 may be one of multiple physical facilities or buildings located across geographic areas that are designated to store networked devices. The data center 104 may include various networking devices, server computers, as well as redundant or backup components and infrastructure for power supply, data communications connections, environmental controls, and various security devices. In some examples, the data center 104 may be a virtual data center, which is a pool or collection of cloud infrastructure resources specifically designed for enterprise needs, and/or for cloud-based service provider needs. Generally, the data center 104 (physical and/or virtual) may provide basic resources such as processor (CPU), memory (RAM), storage (disk), and networking (bandwidth). In some examples, the data center 104 may be associated with a specific enterprise or multiple different enterprises. In examples, one or more of the termination node 106, the App Connector 108, and/or the workload 110 may be running on the resources of the data center 104.

As shown in FIG. 1 the termination node 106 is logically disposed at or near an edge of the data center 104 (e.g., the edge of the enterprise network) between the public internet 114 and the internet dark zone 116. Meanwhile, the App Connector 108 is located deep within the data center 104 near the workload 110. In some examples, the App Connector 108 may additionally connect to other workloads besides the workload 110 shown in FIG. 1. In some examples, the App Connector 108 may establish a session pool 118 of idle sessions 120 (e.g., shown in dotted lines) between the App Connector 108 and the termination node 106. In some examples, the App Connector 108 may be a proxy node (e.g., application segment proxy). In some examples, the termination node 106 may be a relay node, a VPN termination node, a Secure Access Service Edge (SASE) node, an SSH termination node 106, and/or any other Secure Access system.

In some examples, the App Connector 108 may initiate the establishment of the idle sessions 120 between itself and the termination node 106. That is, the App Connector 108 may send connection requests toward the termination node 106 (e.g., direction of arrows on dotted lines in FIG. 1 are toward the termination node 106), rather than the termination node 106 sending the connections requests toward the App Connector 108. In examples, the App Connector 108 can utilize one or more different techniques to traverse NAT and firewall components to establish the idle sessions 120 with the termination node 106. For instance, the termination node 106 may have a publicly known domain name and IP address to service Zero Trust or other secure sessions over the public internet 114, and the termination node 106 may be reachable by the App Connector 108 using this same path. Additionally, or alternatively, the private side of the termination node 106 may be known to the App Connector 108, and the idle session 120 may be built to the private-side.

In some examples, the App Connector 108 may be provisioned with a cryptographic token (e.g., client certificate, JWT, a bearer token, or some equivalent, non-interactive, cryptographically secure mechanism) to authenticate with the termination node 106. In some examples, the App Connector 108 may establish the session pool 118 of idle sessions 120 with the termination node 106 using the cryptographic token to authenticate itself. For instance, prior to or concurrently with establishing the session pool 118 of the idle sessions 120, the App Connector 108 may send the cryptographic token to the termination node 106 for authentication. If the termination node 106 authenticates the App Connector 108, it may allow for the idle sessions 120 to be established. In examples, if a client certificate is used, an underlying TLS session via QUIC may be used to exchange the credential. Additionally, or alternatively, when a bearer token is used, it may be exchanged as part of a CONNECT-UDP header at the MASQUE layer of the protocol.

In some examples, the App Connector 108 may send one or more keepalive message(s) 122 to the termination node 106 to maintain a state of each of the idle sessions 120 in an open state through the security components and/or the networking components that the idle sessions 120 may be traversing. For the case in which the idle sessions 120 are idle UDP sessions, QUIC keepalive message(s) 122 may be used to keep the session state open when that protocol is used. However, the techniques of this disclosure are not limited to idle UDP sessions and QUIC keepalives, and the techniques may be employed with other protocols and keepalives as well, such as IPsec, DTLS, etc., and may provide the same or similar outcome. In examples, the termination node 106 may simply drop the keepalive message(s) 122 when they arrive and this may be a very inexpensive operation, especially when an empty PING frame of the QUIC protocol is being used.

In some examples, a size of the session pool 118 may be fully configurable on a case-by-case basis depending on enterprise policy. For instance, the App Connector 108 may receive a policy indicating a total number of idle sessions 120 for the session pool 118, and then the App Connector 108 may maintain that number of idle sessions 120 in the session pool 118 at all times or as specified. For instance, if the number of idle sessions 120 is specified to be 10, then the App Connector 108 will establish and maintain 10 idle sessions 120 with the termination node 106 at any given time.

In some examples, when the App Connector 108 determines that an idle session 120 of the session pool 118 has been consumed by the termination node 106 and made an active session 124 to establish a communication session for the client device(s) 102 to communicate with the workload 110, the App Connector 108 may establish addition idle sessions 120 to "replace" the active session 124. For instance, the termination node 106 may have received a request from the client device(s) 102 to access the workload 110 and, in response, the termination node 106 utilized one of the idle sessions 120 of the session pool 118 of idle sessions 120 for the client device(s) 102 to access the workload 110. In this way, the client device(s) 102 may send the traffic 112 to the workload 110, as well receive traffic from the workload 110, via the active session 124.

Figure 2:
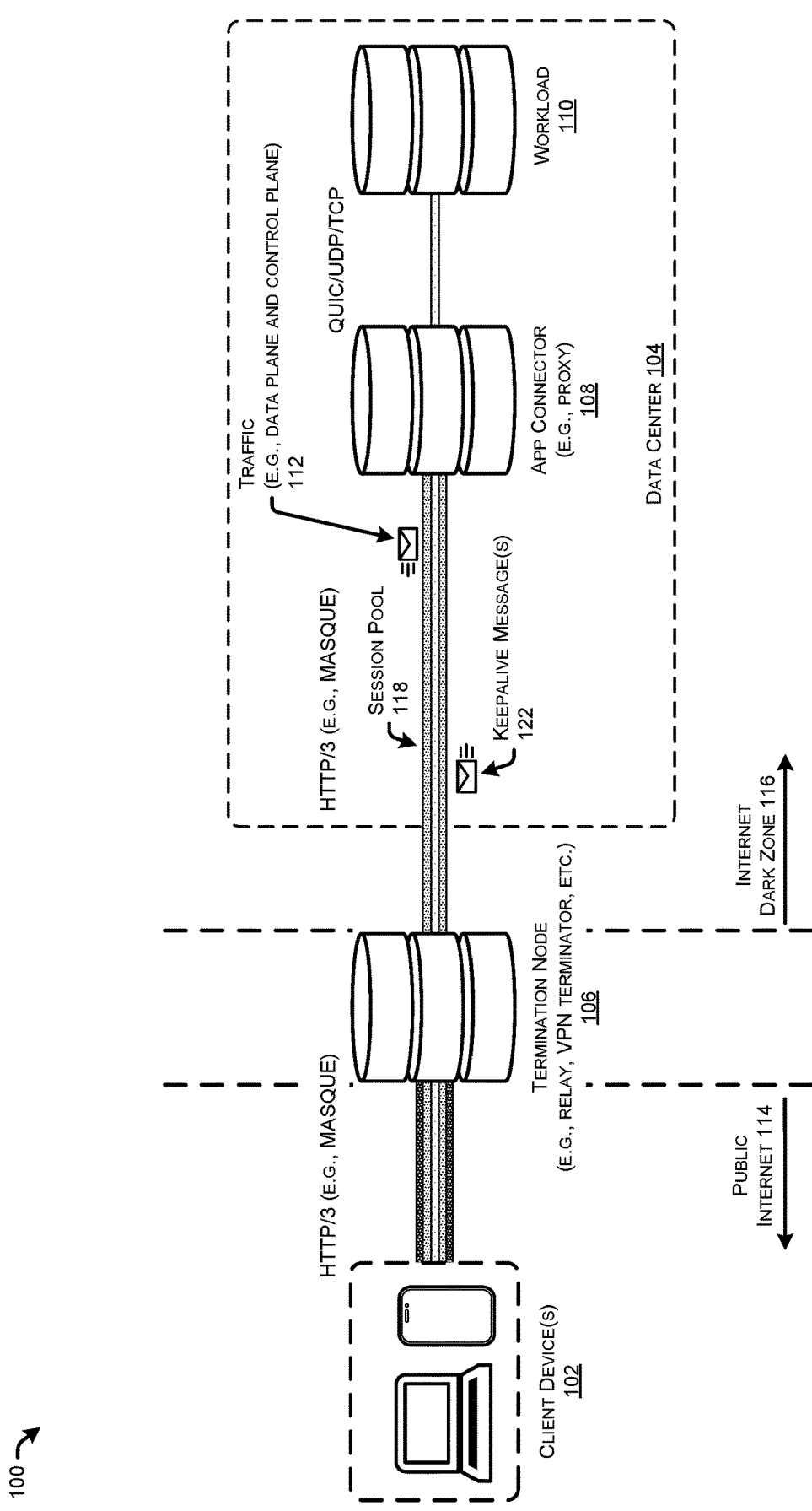
FIG. 2 illustrates additional detail associated with packet encapsulation and protocols that may be used by the example architecture to implement the various aspects of the technologies described herein.

FIG. 2 illustrates additional detail associated with packet encapsulation and protocols that may be used by the example architecture 100 to implement the various aspects of the technologies described herein. As can be seen in FIG. 2, the proxying protocol used between the client device(s) 102 and the App Connector 108 is a HTTP/3 Forward Proxying (e.g., MASQUE) protocol. However, any protocol could be used here including, but not limited to, DTLS, IPsec, SSL, SSH, or any other Secure Access protocol. For purposes of FIG. 2, the proxy protocol is performed over QUIC using HTTP/3 Forward Proxying. QUIC is a UDP-based protocol and, therefore, is connectionless using very little resources to build a bi-directional session. The extra layer of encryption shown in FIG. 2 between the client device(s) 102 and the termination node 106 is optional and shown for completeness as the termination node 106 can perform its tasks without needing an additional layer of encryption between the endpoint (client device(s) 102) and the App Connector 108. The protocol between the App Connector 108 and the workload 110 in FIG. 2 may be QUIC, UDP, or TCP.

Figure 3:
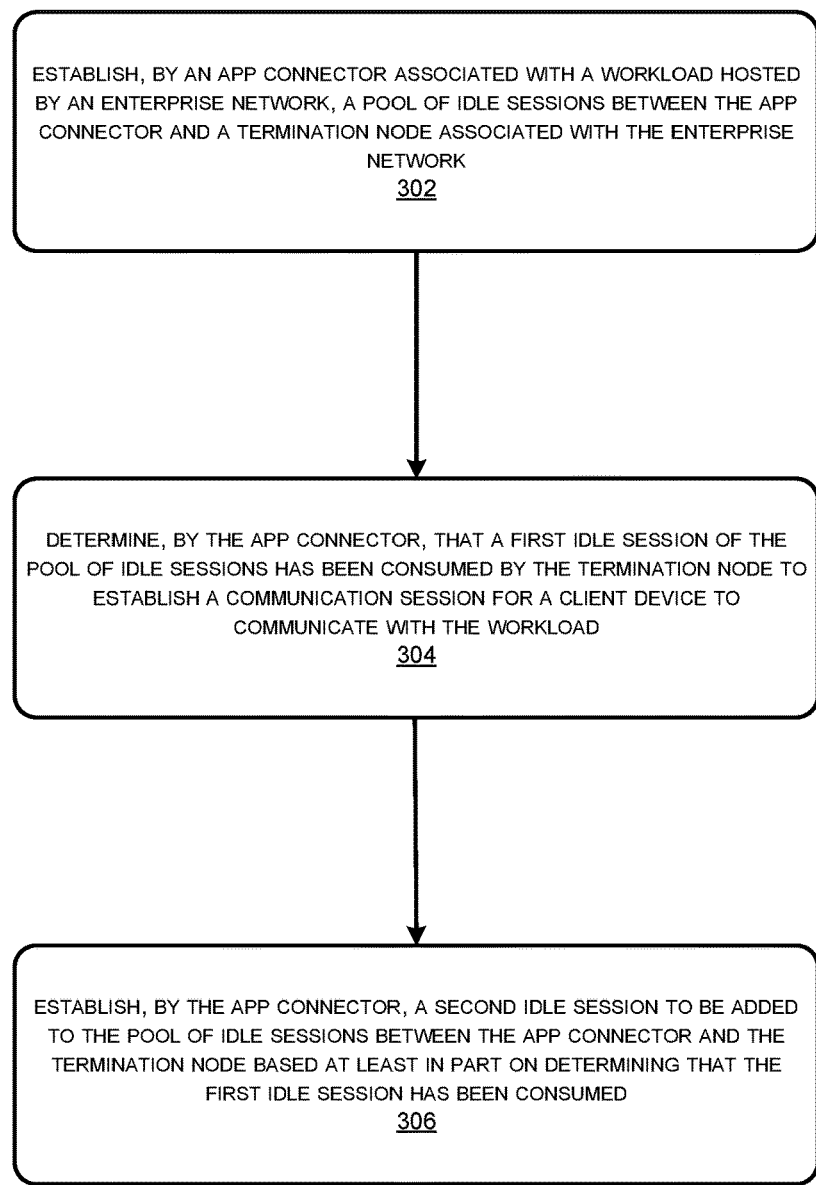
FIG. 3 is a flow diagram illustrating an example method associated with the techniques described herein for creating STUN-less and/or control plane-less in/out App Connectors.

FIG. 3 is a flow diagram illustrating an example method 300 associated with the techniques described herein for creating STUN-less and/or control plane-less in/out App Connectors. The logical operations described herein with respect to FIG. 3 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 300 begins at operation 302, which includes establishing, by an App Connector associated with a workload hosted by an enterprise network, a pool of idle sessions between the App Connector and a termination node associated with the enterprise network. For instance, the App Connector 108 may establish the session pool 118 of the idle sessions 120 between the App Connector 108 and the termination node 106. In examples, the App Connector can utilize different techniques to traverse NAT and firewall components to establish the idle sessions with the termination node. For instance, the termination node may have a publicly known domain name and IP address to service Zero Trust or other secure sessions over the public internet, and the termination node may be reachable by the App Connector using this same path. Additionally, or alternatively, the private side of the termination node may be known to the App Connector, and the idle session may be built to the private-side.

In some examples, the App Connector may be provisioned with a cryptographic token (e.g., client certificate, JWT, a bearer token, or some equivalent, non-interactive, cryptographically secure mechanism) to authenticate with the termination node. In some examples, the App Connector may establish the session pool of idle sessions with the termination node using the cryptographic token to authenticate itself. For instance, prior to or concurrently with establishing the pool of the idle sessions, the App Connector may send the cryptographic token to the termination node for authentication. In some examples, the App Connector may send one or more keepalive message(s) to the termination node to maintain a state of each of the idle sessions in an open state through the security components and/or the networking components that the idle sessions may be traversing.

At operation 304, the method 300 includes determining, by the App Connector, that a first idle session of the pool of idle sessions has been consumed by the termination node to establish a communication session for a client device to communicate with the workload. For instance, the App Connector 108 may determine that the first idle session of the session pool 118 has been consumed or otherwise converted to an active session 124 by the termination node 106 to establish a communication session for the client device(s) 102 to communicate with the workload 110.

At operation 306, the method 300 includes, establishing, by the App Connector, a second idle session to be added to the pool of idle sessions between the App Connector and the termination node based at least in part on determining that the first idle session has been consumed. For instance, the App Connector 108 may establish a second idle session 120 to be added to the session pool 118 between the App Connector 108 and the termination node 106 based at least in part on determining that the first idle session has been converted to the active session 124. In some examples, a size of the session pool may be fully configurable on a case-by-case basis depending on enterprise policy. For instance, the App Connector may receive a policy indicating a total number of idle sessions for the session pool, and then the App Connector may maintain that number of idle sessions in the session pool at all times or as specified. For instance, if the number of idle sessions is specified to be 10, then the App Connector will establish and maintain 10 idle sessions with the termination node at any given time. Additionally, when the App Connector determines that an idle session of the session pool has been consumed by the termination node and made an active session, the App Connector may establish addition idle sessions to "replace" the active session.

Figure 4:
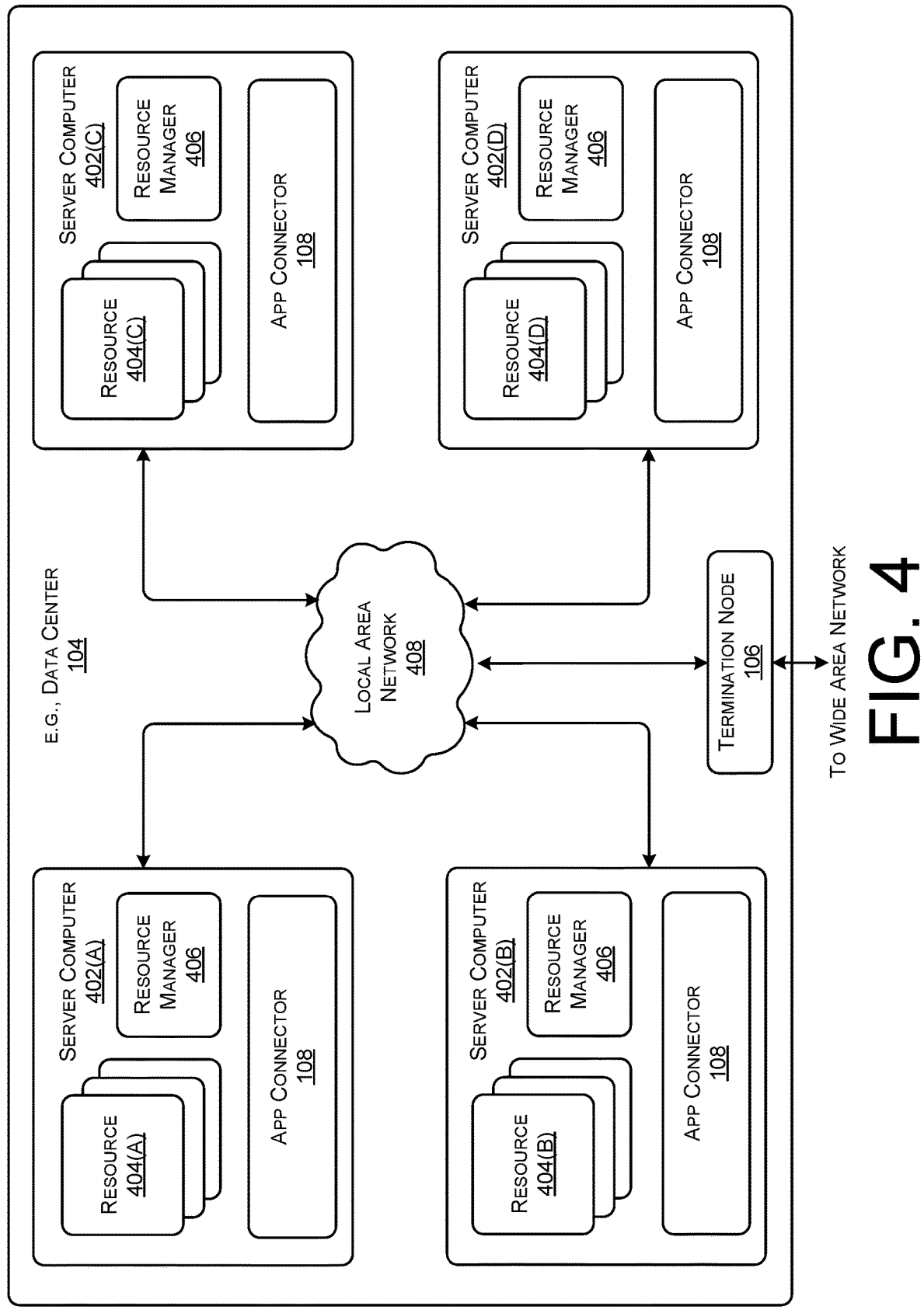
FIG. 4 is a computing system diagram illustrating an example configuration of a data center that can be utilized to implement aspects of the technologies disclosed herein.

FIG. 4 is a computing system diagram illustrating an example configuration of the data center 104 that can be utilized to implement aspects of the technologies disclosed herein. The example data center 104 shown in FIG. 4 includes several server computers 402A-402F (which might be referred to herein singularly as "a server computer 402" or in the plural as "the server computers 402") for providing computing resources. In some examples, the resources and/or server computers 402 may include, or correspond to, the any type of networked device described herein. Although described as servers, the server computers 402 may comprise any type of networked device, such as servers, switches, routers, hubs, bridges, gateways, modems, repeaters, access points, etc.

The server computers 402 can be standard tower, rack-mount, or blade server computers configured appropriately for providing computing resources. In some examples, the server computers 402 may provide computing resources 404 including data processing resources such as VM instances or hardware computing systems, database clusters, computing clusters, storage clusters, data storage resources, database resources, networking resources, VPNs, and others. Some of the servers 402 can also be configured to execute a resource manager 406 capable of instantiating and/or managing the computing resources. In the case of VM instances, for example, the resource manager 406 can be a hypervisor or another type of program configured to enable the execution of multiple VM instances on a single server computer 402. Server computers 402 in the data center 104 can also be configured to provide network services and other types of services.

In the example data center 104 shown in FIG. 4, an appropriate LAN 408 (local area network) is also utilized to interconnect the server computers 402A-402F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers, between each of the server computers 402A-402F in each data center 104, and, potentially, between computing resources in each of the server computers 402. It should be appreciated that the configuration of the data center 104 described with reference to FIG. 4 is merely illustrative and that other implementations can be utilized.

In some instances, the data center 104 may provide computing resources, like tenant containers, VM instances, VPN instances, and storage, on a permanent or an as-needed basis. Among other types of functionality, the computing resources provided by a cloud computing network may be utilized to implement the various services and techniques described above. The computing resources 404 provided by the cloud computing network can include various types of computing resources, such as data processing resources like tenant containers and VM instances, data storage resources, networking resources, data communication resources, network services, VPN instances, and the like. The computing resources 404 shown in FIG. 4 may correspond with the workload 110 described in FIGS. 1 and 2.

Each type of computing resource 404 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 404 not mentioned specifically herein.

The computing resources 404 provided by a cloud computing network may be enabled in one embodiment by one or more data centers 400 (which might be referred to herein singularly as "a data center 104" or in the plural as "the data centers 400"). The data centers 400 are facilities utilized to house and operate computer systems and associated components. The data centers 400 typically include redundant and backup power, communications, cooling, and security systems. The data centers 400 can also be located in geographically disparate locations. One illustrative embodiment for a data center 104 that can be utilized to implement the technologies disclosed herein will be described below with regard to FIG. 5.

Also illustrated in FIG. 4 are the logical locations of the termination node 106 and the App Connector 108. For instance, the termination node 106 is disposed at or near an edge of the data center 104, while the App Connector 108 is disposed deep inside the data center 104 proximate to the resources 404. Although shown as multiple App Connectors in FIG. 4, it is to be understood that a single App Connector could be used and disposed between the server computers 402 and the LAN 408. The App Connector 108 may also be collocated at the edge with the termination node 106 as another configuration option.

Figure 5:
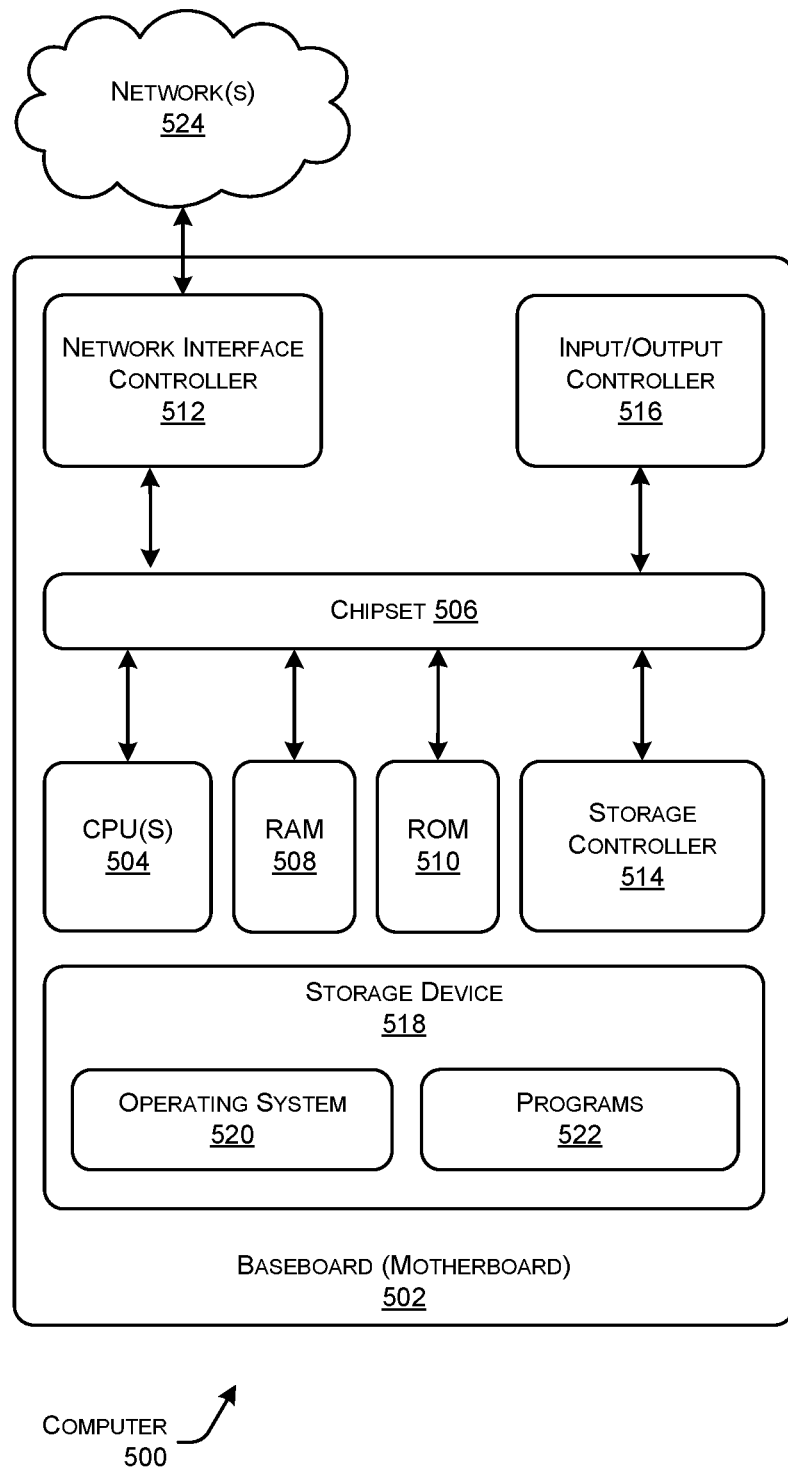
FIG. 5 is a computer architecture diagram showing an illustrative computer hardware architecture for implementing a computing device that can be utilized to implement aspects of the various technologies presented herein.

FIG. 5 is a computer architecture diagram showing an illustrative computer hardware architecture for implementing a computing device that can be utilized to implement aspects of the various technologies presented herein. The computer architecture shown in FIG. 5 illustrates a conventional server computer, network node (e.g., secure access node), router, workstation, desktop computer, laptop, tablet, network appliance, e-reader, smartphone, load balancer, or other computing device, and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 505. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 505 provides an interface between the CPUs 504 and the remainder of the components and devices on the baseboard 502. The chipset 505 can provide an interface to a RAM 508, used as the main memory in the computer 500. The chipset 505 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network. The chipset 505 can include functionality for providing network connectivity through a NIC 512, such as a gigabit Ethernet adapter. The NIC 512 is capable of connecting the computer 500 to other computing devices over the network 524. It should be appreciated that multiple NICs 512 can be present in the computer 500, connecting the computer to other types of networks and remote computer systems. In some examples, the NIC 512 may be configured to perform at least some of the techniques described herein.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 505. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the architecture 100 and or any components included therein, may be supported by one or more devices similar to computer 500. Stated otherwise, some or all of the operations performed by the architecture 100, and or any components included therein, may be performed by one or more computer devices 500 operating in a scalable arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes and functionality described above with regard to FIGS. 1-4, and herein. The computer 500 can also include computer-readable storage media having instructions stored thereupon for performing any of the other computer-implemented operations described herein.

The computer 500 can also include one or more input/output controllers 515 for receiving and processing input from a number of input devices, such as a keyboard, a mouse, a touchpad, a touch screen, an electronic stylus, or other type of input device. Similarly, an input/output controller 515 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

The computer 500 may include one or more hardware processors (processors) configured to execute one or more stored instructions. The processor(s) may comprise one or more cores. Further, the computer 500 may include one or more network interfaces configured to provide communications between the computer 500 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure for creating in/out App Connectors for secure access solutions without the need for STUN, TURN, and/or a long-lived control plane component.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
establishing a pool of idle sessions between an App Connector and a client device, the App Connector associated with a workload that is hosted by an enterprise network;
determining that a first idle session of the pool of idle sessions has been consumed to establish a communication session for the client device to communicate with the workload; and
based at least in part on determining that the first idle session has been consumed, establishing a second idle session to be added to the pool of idle sessions.

2. The method of claim 1, wherein the first idle session is utilized to establish data plane and control plane communications between the App Connector and the client device.

3. The method of claim 1, further comprising receiving a policy indicating a number of idle sessions for the pool of idle sessions, wherein establishing the pool of idle session comprises establishing the number of idle sessions.

4. The method of claim 1, wherein each idle session of the pool of idle sessions traverses at least one of a security component or a networking component disposed between the client device and the App Connector.

5. The method of claim 4, further comprising sending keepalive messages to maintain a state of the idle sessions in an open state through the at least one of the security component or the networking component.

6. The method of claim 4, wherein the security component is a firewall and the networking component is a network address translation (NAT) component supporting traversal capabilities.

7. The method of claim 1, wherein the App Connector is disposed at a network location that is within the enterprise network proximate the workload.

8. A system comprising:
one or more processors; and
one or more non-transitory computer-readable media storing instructions that, when executed by the one or more processors, cause the system to perform operations comprising:
establishing a pool of idle sessions between an App Connector and a client device, the App Connector associated with a workload that is hosted by an enterprise network;
determining that a first idle session of the pool of idle sessions has been consumed to establish a communication session for the client device to communicate with the workload; and
based at least in part on determining that the first idle session has been consumed, establishing a second idle session to be added to the pool of idle sessions.

9. The system of claim 8, wherein the first idle session is utilized to establish data plane and control plane communications between the App Connector and the client device.

10. The system of claim 8, further comprising receiving a policy indicating a number of idle sessions for the pool of idle sessions, wherein establishing the pool of idle session comprises establishing the number of idle sessions.

11. The system of claim 8, wherein each idle session of the pool of idle sessions traverses at least one of a security component or a networking component disposed between the client device and the App Connector.

12. The system of claim 11, further comprising sending keepalive messages to maintain a state of the idle sessions in an open state through the at least one of the security component or the networking component.

13. The system of claim 11, wherein the security component is a firewall and the networking component is a network address translation (NAT) component supporting traversal capabilities.

14. The system of claim 8, wherein the App Connector is disposed at a network location that is within the enterprise network proximate the workload.

15. One or more non-transitory computer-readable media storing instructions that, when executed, cause one or more computing devices to perform operations comprising:
establishing a pool of idle sessions between an App Connector and a client device, the App Connector associated with a workload that is hosted by an enterprise network;
determining that a first idle session of the pool of idle sessions has been consumed to establish a communication session for the client device to communicate with the workload; and
based at least in part on determining that the first idle session has been consumed, establishing a second idle session to be added to the pool of idle sessions.

16. The one or more non-transitory computer-readable media of claim 15, wherein the first idle session is utilized to establish data plane and control plane communications between the App Connector and the client device.

17. The one or more non-transitory computer-readable media of claim 15, further comprising receiving a policy indicating a number of idle sessions for the pool of idle sessions, wherein establishing the pool of idle session comprises establishing the number of idle sessions.

18. The one or more non-transitory computer-readable media of claim 15, wherein each idle session of the pool of idle sessions traverses at least one of a security component or a networking component disposed between the client device and the App Connector.

19. The one or more non-transitory computer-readable media of claim 18, further comprising sending keepalive messages to maintain a state of the idle sessions in an open state through the at least one of the security component or the networking component.

20. The one or more non-transitory computer-readable media of claim 18, wherein the security component is a firewall and the networking component is a network address translation (NAT) component supporting traversal capabilities.

\* \* \* \* \*